United States Patent [19]

Jacoby et al.

[11] Patent Number: 4,647,921

[45] Date of Patent: Mar. 3, 1987

[54] ALPHANUMERIC DISPLAY

[75] Inventors: Herbert Jacoby, Farmington; John C. Doane, Glastonbury; Joe K. Koe, Avon, all of Conn.

[73] Assignee: Otis Elevator Company, Farmington, Conn.

[21] Appl. No.: 588,417

[22] Filed: Mar. 12, 1984

[51] Int. Cl.$^4$ .............................................. G09G 3/02
[52] U.S. Cl. .................................... 340/716; 340/789; 340/794; 340/802; 187/100
[58] Field of Search ............... 340/802, 789, 790, 706, 340/21, 716, 756, 794, 728

[56] References Cited

U.S. PATENT DOCUMENTS 3,878,531  4/1975  McClelland ........................ 340/756
4,216,471  8/1980  Akred, Sr. ......................... 340/802
4,482,894  11/1984  Matsui et al. ....................... 340/756

FOREIGN PATENT DOCUMENTS 2145258  8/1983  United Kingdom ............... 340/794

Primary Examiner—Gerald L. Brigance
Assistant Examiner—Jeffery A. Brier

[57] ABSTRACT

A display (22) has one or more digits (22-1, 22-2) each capable of displaying a plurality of alphanumeric characters. A character control (10) has an output line (12) for each possible character and provides a signal over the line to cause the character to be displayed by activating an opto-isolation device (20-1). The output lines (20-1) are connected to a plurality of scan devices (26-1) which are individually addressed by a computer (28). Each scan device (26-1) is connected to a group of lines (20-2) that are individually addressed by the computer (28). When a line (20-2,20-3) is found to have a signal on it, the line is given a name which is used by the computer (28) to read a stored code from a memory (28-2). This code is keyed to the display to cause the display to provide the character associated with the line name, hence, the line, and the code is then supplied serially to the display which displays the character when all the components of the code have been received. The character continues to be displayed until a new code is provided.

6 Claims, 2 Drawing Figures

ALPHANUMERIC DISPLAY

DESCRIPTION

1. Technical Field

This invention pertains to alphanumeric (AN) displays.

2. Background Art

This invention originates with elevator systems. Car position indicators in many older elevator systems consist of a "projection system" that images AN characters on a screen in response to individual character control signals. The number of AN character control lines is the number of possible characters, and these lines are an integral part of the system, which simply means they cannot be replaced economically.

Newer AN display systems, such as electroluminescent, fluorescent, LED or LCD, offer many advantages. They are more reliable, need less service, offer lower installation and replacement cost, and are considered attractive. These qualities make new AN displays a desirable retrofit for upgrading older elevator systems. But, incorporating new AN displays in existing equipment is not simple. Using different voltages and special coded drive signals, just to name a few differences, new displays are somewhat incompatible with older systems—unless major reworking is made to the older system.

DISCLOSURE OF INVENTION

An object of the present invention is to provide a simple, economical replacement for older AN displays in systems using the existing individual character control lines.

According to the invention, the voltage level of each existing character control line is scanned to identify those characters to be activated. From this scan a conversion code is made to provide the correct code for the new AN display. The code is stored and applied to the display drive until a new code is generated from a subsequent scan.

According to one aspect of the present invention, the status of each character control line is applied to a programmable scanner that is controlled by a computer, which by following with preestablished instructions, scans the character control lines and determines the status of each, storing in memory the identity of each activated line. The computer uses these stored identifiers to enter a look-up table that is keyed to the AN display to produce a character code word, compatible with the display to cause the display drive to energize the correct characters. The computer stores this word, and after all are stored, provides them to a display driver that operates to activate the characters identified by the stored words.

According to the invention, each character code word is provided serially by the computer.

According to the invention, the character control lines, which normally are applied directly to a display drive, are applied to the input of opto-isolators, to provide a low voltage signal which is applied to the controlled selector or scanner.

According to the invention, the character control lines are applied to two banks of scanners, one corresponding to the least significant characters, the "units" in a two character word; the other, the most significant (the "tens") are applied to another bank of scanners. In scanning these scanners, the computer scans first for units, and upon finding an activated unit line stores a word identifying it, then proceeds to scan the tens lines, and upon sensing an activated one of those, stores another character word identifying the line. Next, the computer uses these words to address the correct code in the EPROM, then stores that code, and then outputs the code serially to the driver, activating the display, once all the bits in the words are received. The display remains illuminated until a new word is received. Among numerous features of the present invention, a retrofit readout may be extremely inexpensive to install, and easily connected to an existing system, and programmed specifically for the system simply by reprogramming the EPROM. Moreover, it can be used to retrofit a system, which, like some elevators, have separate control lines for each character.

BEST MODE FOR CARRYING OUT THE INVENTION

Figure 1:
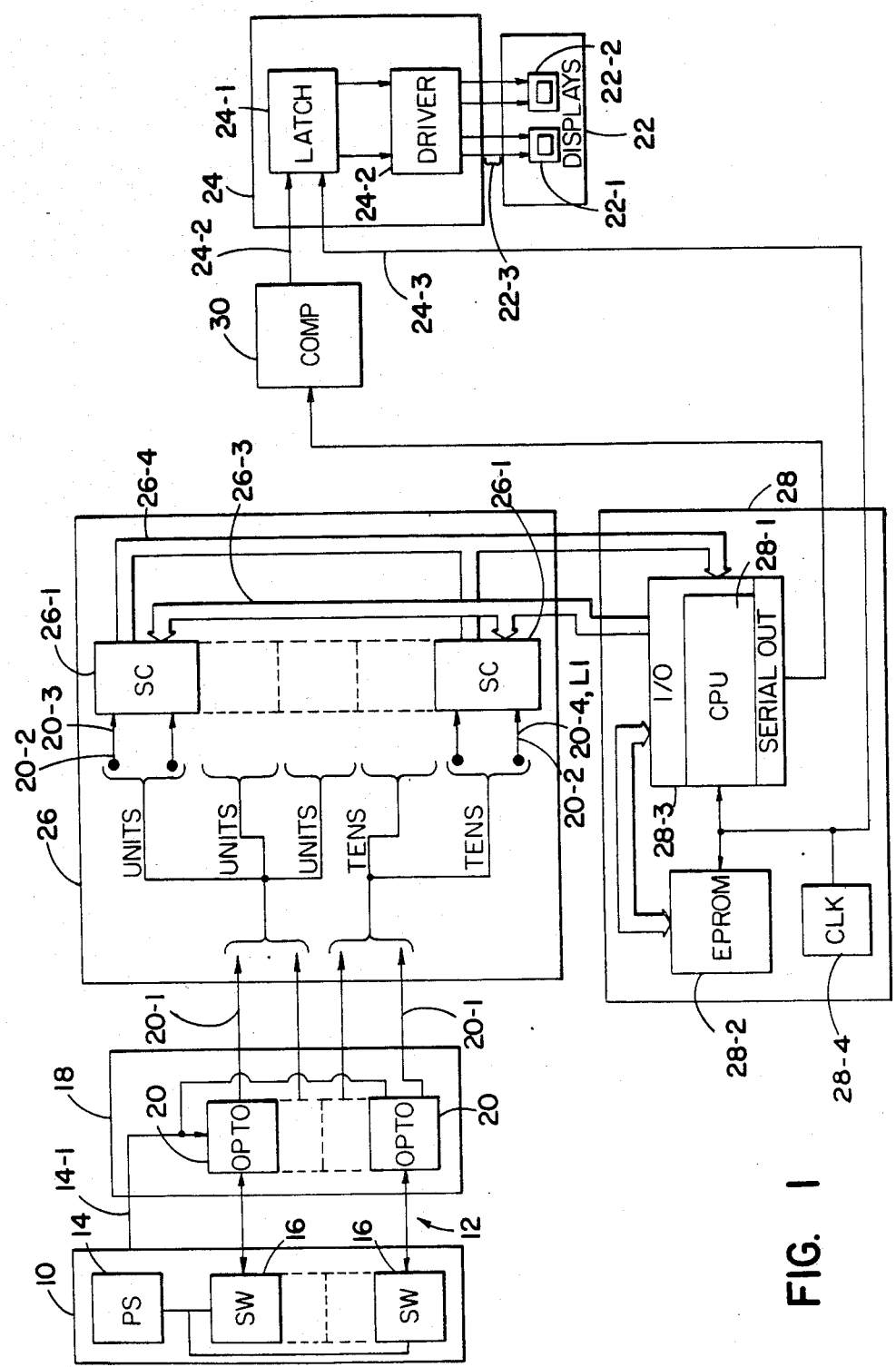
FIG. 1 is a functional block diagram of a display system embodying the present invention.

The lamp display control 10 that is shown in FIG. 1 is found in many elevator systems, where it controls individual lamps (bulbs) in an AN display, in the car or hall, to indicate car position and/or direction. A plurality of character control lines 12 extend from this control, which includes a power supply 14 and switches 16 which, in the typical case, are SCRs (the switches may also be relays, depending upon the sophistication of the system). The power supply 12 normally supplies power to a lamp or a bulb, and the switch completes the circuit through each line 12, illuminating the bulb. The prior art bulbs or displays are not shown.

The character control lines 12 here are connected to an isolation unit 18 which includes a plurality of opto-isolators 20 (Litronix's ILQ opto-isolator). The power supply line 14-1 is common to all of the opto-isolators. One of the lines 12 returns to the switch 16. When the switch 16 is operated, the opto-isolator is activated, through the power supply, producing an output signal on the line 20-1.

The system of FIG. 1 contains an AN display 22, in this instance consisting of two characters, for example, two 16 segment fluorescent characters 22-1, 22-2. A display driver 24 is present which consists of a driver and latch combination (e.g., National Semiconductor's model MM5445), which is, well known for this use. The latch receives two BCD words *serially* on the line 24-2, and each identifies a character in the two character displays. The words are provided synchronously with a clock signal on the line 24-3 and applied simultaneously to the driver 24-2, which activates the correct lines 22-3 on the display to display the coded characters.

This system converts the voltage signals on the opto-isolation unit output lines into the correct binary coded decimal signal for displaying the right character in response to activation of any of the control lines from the switch unit (the existing circuitry in the system).

The opto-isolator output lines 20-1 are applied to a selector 26 which consists of a plurality of individual, programmable scanners 26-1 (e.g., Motorola's 74LS251 multiplier). Each receives several opto-isolator output lines 20-2. For example, assume there are 24 control lines 12, there will be 24 opto-isolator lines, and six scanner units 26-1, each receiving four opto-isolator lines and having four output lines. Each of these scanners receives an input or address signal on the line 26-3 that identifies one of the lines 20-2. The address line (identifying one of the four lines) causes the line's status (high or low) to be indicated on an output line 26-4. The address lines 26-3 and the output lines 26-4 are connected to a microcomputer 28, which provides an address that identifies the scanner and the line scanned in the scanner. The computer contains a CPU 28-1 (e.g., Intel's 8748 processor), and an EPROM 28-2 (e.g., National Semiconductor's 2716 EPROM), also connected to the IO port 28-3 and a system clock 28-4 which provides the clock signal on the line 24-3. The EPROM contains addresses that identify the correct binary coded decimal signal for the display for each character control line.

Figure 2:
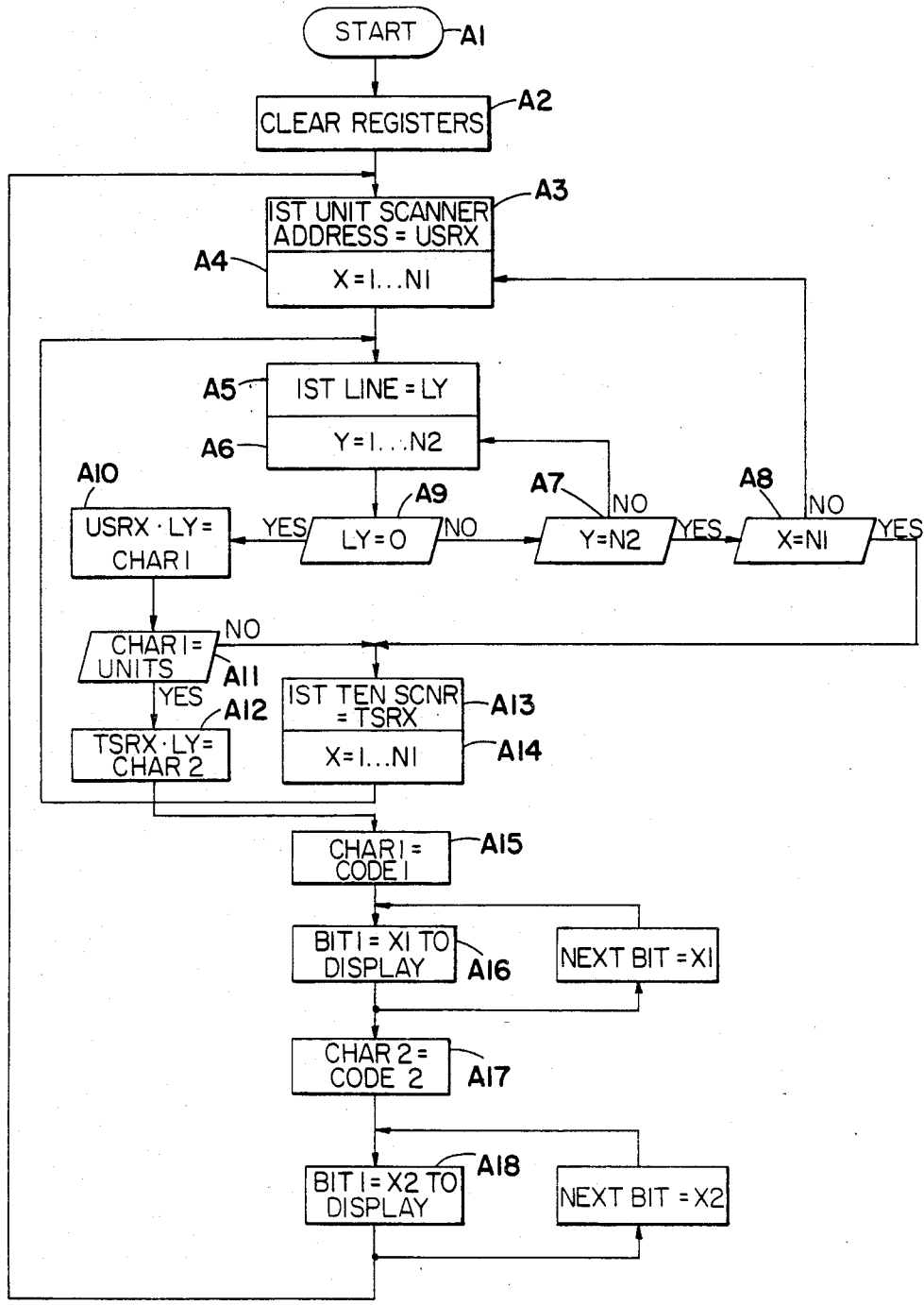
FIG. 2 is a flow chart that shows the computer sequence for generating the serially provided word to the display driver.

The computer 28 scans each of the scanners 26-1 and each of their outputs and or more times, to determine which are low. On finding one, it activates the correct character in the display; if two, it activates both characters. FIG. 2, a flowchart of this computer sequence, begins with step A1. At A2 initialization of all the registers takes place. The first unit scanner is assigned an address (USRX) at A3, and at A4 X, which may be 1 through N1, is set at one, meaning the first of the scanners has been selected, which is assumed, for illustration, to be the one connected to those lines L1-LN2 that identify unit characters. Next, at A5, the first line, LY, is selected and at A6 Y is set to one, meaning the first line on the first scanner. At A9, a test is made of the first line; if it is 0, then the character associated with that line is to be displayed in the units character. If the answer is negative, the test at A7 finds if all the lines on the first scanner have been tested in this manner (these are the lines L1-LN2. If not, the procedure repeats, starting at A6. In an affirmative answer at A7, however, another test is made, at A8, as to whether every unit scanner (scanner connected to unit character lines 20-2) has been tested. If not, X is sequenced, for instance, to the next unit scanner. If during this testing process an affirmative answer is obtained at A8, then the identity of the line (LY) and the scanner (USR), CHAR 1, together define the first unit character. At A11, a test is made to determine if CHAR 1 is units (or tens). If the answer is affirmative, then the tens lines need to be scanned. The sequence goes to step A13, where the first of the "tens" scanners is selected, these being identified by addresses TRS(X). In step A14, X is set to 1, and the sequence then returns to step A5, which commences the selection process to determine the status of each of the output lines from the first of the ten scanners. The procedure continues until all of the "tens" scanners (TSR1-N1) are sensed. If any one of the lines produces an affirmative answer to the test A9, this results in a second character, CHAR 2, which identifies the character line; this is the "tens" identifier. At A15, CHAR 1, the "units" identifier is applied to the EPROM, resulting in the generation of the CODE 1 word, the correct digital word to display the character on the display 22-2. In the next step A16, CODE 1 is serially (generated bit-by-bit) applied to the latch 24-1. At A17, the CHAR 1, which identifies the "tens" character, is applied to the EPROM, yielding the CODE 2 word. At A18, CODE 2 is provided bit-by-bit to the driver latch. The process then returns to step A3, where, once again, the scanners are selectively sensed beginning with the first unit scanner USR(X), for X=1. Until new CODE 1 and CODE 2 words are generated, the two characters associated with CODE 1 and CODE 2 are displayed.

Quite obviously, this scanning strategy may be used to scan for more than just two characters, and, obviously, other modifications and variations are possible by one skilled in the art without departing from the true scope and spirit of the invention that has been described.

We claim:

1. An alphanumeric display characterized by:
   first means for displaying one of a plurality of selectable characters in one or more digits;
   second means having a plurality of output lines for providing a first character signal associated with each selectable character on a selected one of said plurality of output lines;
   third means connected to the plurality of output lines for providing a second character signal that indicates the presence of the first character signal on the selected one of said plurality of output lines line, said third means providing said second signal in response to a received one of a plurality of line address signals that identifies the line;
   signal processing means for providing said line address signals in a predetermined repetitive sequence to said third means and receiving the second character signal during the sequence when the one line address signal is provided and providing a character code signal from a stored list of character code signals, each character code signal representing a code for displaying the character associated with the second signal on the first means and being provided in response to said second signal, the sequence of providing the line address signals being such that the line address signals are provided in accordance with the numerical order of significance of the character associated with each of the plurality of output lines;
   fourth means for displaying on the first means the character represented by each character code signal provided thereto by said processing means.

2. An alphanumeric display according to claim 1, characterized in that:
   said third means comprises a plurality of individual line selection means, each line selection means being connected to a group of said output lines and individually addressed by and responsive to a group signal and a line address signal for providing the second character signal, the group signal identifying the group to which the selection means is connected to and the line address signal identifying a particular output line in said group;
   said processing means comprises means for providing said group signal followed by the line address signal in said repetitive sequence.

3. A display according to claims 1 or 2, characterized in that:
   said second means comprises a power supply that provides power to an opto-isomation device connected to one of said output lines and switch means connected to each opto-isolation device for individually operating the opto-isolation device from the power supply to provide said first character signal on an output from the opto-isolation device.

4. A display according to claim 1, characterized in that:

said processing means comprises means for providing the character code for the digits sequentially, the character code comprising serial bits;

said fourth means comprises means for receiving the character code, and upon receiving all the bits in the character code causing the character to be displayed on one digit.

5. A method for providing alphanumeric characters from a plurality of lines, each of which carries a display signal to cause a particular character to be displayed, characterized by:

activating one of a plurality of opto-isolation devices with a display signal to provide a second signal on a corresponding second signal line;

scanning the second signal lines in a repetitive sequence by addressing each line and providing a first signal on another line when a second signal is on the addressed line;

storing a line address signal that identifies the address of the second signal line on which the second signal is present;

storing a plurality of character codes in a memory device in which one code is addressable and readable in response to the line address signal, each character code identifying a decimal character;

applying the line address signal to the memory device and reading the corresponding character code;

providing the character code to a display which reads the code and displays the character associated with the code.

6. A method according to claim 4, characterized by:

providing the character code successively for each digit in the display.

* * * * *